United States Patent

[11] 3,615,209

| [72] | Inventors | Mack P. Whittaker<br>Johnson City;<br>William F. Wilson, Elizabethton, both of Tenn. |
|---|---|---|
| [21] | Appl. No. | 837,951 |
| [22] | Filed | June 30, 1969 |
| [45] | Patented | Oct. 26, 1971 |
| [73] | Assignee | Great Lakes Carbon Corporation<br>New York, N.Y.<br>Continuation-in-part of application Ser. No. 782,762, Dec. 10, 1968, now abandoned. |

[54] METHOD OF GRAPHITIZATION
5 Claims, No Drawings

[52] U.S. Cl. .................................................. 23/209.1,
264/29
[51] Int. Cl. ........................................... C01b 31/04

[50] Field of Search ........................................... 23/209.1,
209.5, 209.9; 264/29

[56] References Cited
UNITED STATES PATENTS

| 2,315,346 | 3/1943 | Mitchell | 23/209.1 |
| 3,338,993 | 8/1967 | Juel et al | 264/29 |

FOREIGN PATENTS

| 1,193,853 | 5/1965 | Germany | 23/209.1 |
| 564,400 | 10/1958 | Canada | 23/209.1 |

*Primary Examiner*—Edward J. Meros
*Attorney*—Carl F. Peters

ABSTRACT: Alkaline earth metal and manganese compounds added to mixtures of sulfur-containing carbon and rare earth catalyst will drive the graphitization process to substantial completion at lower than normal temperatures. Calcium, added in the form of its oxide or one of its salts in quantities dependent on the sulfur content of the carbon, is preferred.

METHOD OF GRAPHITIZATION

This application is a Continuation-in-Part of our earlier filed application, Ser. No. 782,762, filed Dec. 10, 1968 for Method Of Graphitization now abandoned.

BACKGROUND OF THE INVENTION

It is known that the transformation of relatively amorphous carbon to the more crystalline state of graphite can be influenced by several common elements such as silica and iron. More recently (ref. German Pat. No. 1,193,853), it has been established that rare earth compounds, particularly ceric oxide, exert a remarkable catalytic influence on the graphitization of amorphous carbon. It has been noted, however, that this catalysis is sometimes inhibited in some degree which appears to be related to the amount of sulfur present in a given amorphous carbon material.

SUMMARY OF THE INVENTION

An object of the present invention is to provide a process capable of overcoming the undesirable action of sulfur in the rare earth catalysis of amorphous carbon graphitization.

This and other objects which shall become apparent in the course of the description of the invention, have been accomplished by incorporating an alkaline earth metal or manganese oxide or salt into a graphitizable mix comprising an amorphous sulfur-containing carbon aggregate and a rare earth catalyst present in conventional proportions. The alkaline earth metal or manganese compound is used in quantities that are related to the amount of sulfur present in the amorphous carbon, the preferred weight proportion being within the range of 0.5 to 5 parts, calculated as calcium or calcium equivalent, per 100 parts of amorphous carbon material present. Calcium, in the form of its oxide or of one of its salts, is the preferred material for carrying out the invention.

The use of calcium or manganese or of related substances, which by themselves show no striking catalytic activity, leads to the realization of substantially the maximum catalytic potential of the rare earth compounds such as ceric oxide. The importance of the process can be estimated by considering that most commercial amorphous carbon sources, arising as they do from coal or petroleum, contain significant amounts of sulfur and therefore do not benefit from the maximum influence of the rare earth catalysts. That the inclusion of the calcium or manganese type of material in the carbon-catalyst mix should result in substantially complete conversion of the carbon to a polycrystalline graphite of superior quality, and that this should occur at temperatures lower than previously thought possible, is a surprising development. This shall now be described in greater detail.

PREFERRED EMBODIMENTS

EXAMPLE

The additives, when used, are dry mixed with petroleum coke particles and the mixture is heated. The degree of graphitization at any particular heat treatment temperature is determined by the method of Bacon and Franklin, as described in Acta Crystallographica, Vol. 4, page 255 et seq. (1951) and, with greater detail, in A.E.R.E. report M/R 2702 Oct. 1958) published by the United Kingdom Atomic Energy Authority entitled "Crystallographic Studies of Graphite." This determination is based on the X-ray diffraction measurement of the interplanar distances in the product.

The following table summarizes the components of various mixtures used, the temperatures to which these mixtures were heated and the results obtained in terms of percent graphitization. Petroleum coke from one source, containing approximately 1.2 percent total sulfur, was used in all cases.

| Graphitization Additives | Percent Graphitization | | | | |
|---|---|---|---|---|---|
| | 2200° | 2300° | 2500° | 2700° | 2900° |
| Treatment Temperatures: | | | | | |
| None (coke blank) | | 22 | 45 | 54 | 64 |
| 5% CaF$_2$ | | 34 | 47 | 57 | 59 |
| 5% CeO$_2$ | | 49 | 68 | 60 | 62 |
| 5% CeO$_2$ + 5% CaCO$_3$ | 100 | | 100 | 100 | |
| 5% CeO$_2$ + 5% MnO$_2$ | 88 | | | | |

It becomes evident on examination of these results that the combined action of the rare earth catalyst, cerium oxide, and of the much poorer catalyst, the alkaline earth metal carbonate or manganese oxide, drives the graphitization reaction of the amorphous carbon to an early completion. In fact, the very high degree of conversion observed in the presence of calcium or manganese is actually achieved between the temperature of 1,800° and 2,200° C. since a similar sample containing calcium and cerium, treated at 1,800° C. for 30 minutes is almost completely graphitized at the lower temperature and is completely graphitized at 2,200° C.

A similar behavior will be observed for preparations containing other calcium related compounds such as for instance barium oxide, although optimum temperatures will of course vary somewhat according to the nature of the alkaline earth metal and other relevant factors such as concentration, type of carbon aggregate and sulfur content.

Furthermore, it is obvious that, due to the temperatures at which these materials function, compounds other than carbonates and fluorides can be used successfully in this invention. A list of such usable compounds includes the oxides of the alkaline earth metals and manganese as well as their salts, for instance the chlorides, sulfates, phosphates and oxalates. It is also evident that the incorporation into the graphitizable mixture may be carried out by conventional techniques other than dry mixing, for instance by impregnation of the carbon particles with a solution of the alkaline earth metal or manganese salt. In any event, the selected compound is best added before the amorphous carbon is heat treated at temperatures greater than 1,000° C. when the rare earth catalyst is already present.

It is finally evident that many substitutions and variations may be made either in the nature and the proportions of the graphitizable mix components, without departing from the scope of the invention which is limited only by the following claims.

What is claimed is:

1. In a process for graphitizing sulfur-containing carbon comprising the heat treatment at a temperature of at least 1,800° C. of a mixture of, on a weight basis, 100 parts of carbon aggregate with up to 10 parts of a rare earth material, calculated as rare earth oxide, the improvement comprising admixing the carbon aggregate-rare earth mixture before subjecting said mixture to temperatures greater than about 1,000° C., with a compound selected from the class consisting of the oxides, the hydroxides, and the salts of alkaline earth metals and manganese, and mixtures thereof.

2. The process of claim 1 wherein the rare earth material used is ceric oxide.

3. The process of claim 1 wherein the alkaline earth metal compound is selected from the class consisting of the oxide, the hydroxide and the salts of calcium.

4. The process of claim 1 wherein from about 0.5 to 5 parts of calcium or manganese per 100 parts of the amorphous carbon are added to the carbon-rare earth mixture.

5. The process of claim 1 wherein about 5 parts by weight of ceric oxide and about 5 parts of calcium carbonate are used for each 100 parts of amorphous carbon.